US010015085B2

(12) United States Patent
Li

(10) Patent No.: US 10,015,085 B2
(45) Date of Patent: Jul. 3, 2018

(54) PACKET FORWARDING METHOD, CONTROLLER, FORWARDING DEVICE, AND NETWORK SYSTEM

(71) Applicant: Huawei Technologies Co., Ltd., Shenzhen, Guangdong (CN)

(72) Inventor: Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/099,169

(22) Filed: Apr. 14, 2016

(65) Prior Publication Data

US 2016/0234106 A1   Aug. 11, 2016

Related U.S. Application Data

(63) Continuation of application No. PCT/CN2013/085496, filed on Oct. 18, 2013.

(51) Int. Cl.
*H04L 12/723* (2013.01)
*H04L 12/66* (2006.01)
(Continued)

(52) U.S. Cl.
CPC .......... *H04L 45/50* (2013.01); *H04L 12/4641* (2013.01); *H04L 12/66* (2013.01);
(Continued)

(58) Field of Classification Search
CPC ....... H04L 45/50; H04L 45/745; H04L 12/66; H04L 12/4641; H04L 45/02; H04L 12/465; H04L 45/507; H04L 45/026
See application file for complete search history.

(56) References Cited

U.S. PATENT DOCUMENTS 9,178,798 B2 * 11/2015 Esale ................. H04L 45/16
9,602,430 B2 *  3/2017 Vobbilisetty ........... H04L 12/46
(Continued)

FOREIGN PATENT DOCUMENTS

| CN | 1703016 A | 11/2005 |
| CN | 103297262 A | 9/2013 |
| CN | 103348638 A | 10/2013 |

OTHER PUBLICATIONS

Zhenbin Li et al., "Applicability of LDP Multi-Topology for Unicast Fast-reroute Using Maximally Redundant Trees", Apr. 26, 2013, 25 pages.
(Continued)

*Primary Examiner* — Brian O'Connor

(57) ABSTRACT

A network system includes one controller and a plurality of forwarding devices, where the forwarding devices form a plurality of virtual network topologies; the controller is configured to allocate a global label to each of the plurality of virtual network topologies, and send a binding relationship between the global labels and the virtual network topologies to the forwarding devices, where global labels allocated to different virtual network topologies are different; the forwarding devices are configured to receiving the binding relationship, and generate label forwarding entries including a mapping relationship between the global labels and forwarding information bases; and when a packet received by the forwarding device carries a global label, the forwarding device searches according to the global label, a forwarding information base of a virtual network topology corresponding to the global label, and determines that the packet is to be forwarded by using the forwarding information base.

19 Claims, 11 Drawing Sheets

(51) Int. Cl.
*H04L 12/741* (2013.01)
*H04L 12/751* (2013.01)
*H04L 12/46* (2006.01)

(52) U.S. Cl.
CPC ............ *H04L 45/02* (2013.01); *H04L 45/745* (2013.01); *H04L 12/465* (2013.01); *H04L 45/026* (2013.01); *H04L 45/507* (2013.01)

(56) References Cited

U.S. PATENT DOCUMENTS

| | | | |
|---|---|---|---|
| 9,699,001 B2* | 7/2017 | Addanki | H04L 12/465 |
| 9,699,082 B2* | 7/2017 | Moreno | H04L 45/745 |
| 2004/0165601 A1 | 8/2004 | Liu et al. | |
| 2004/0210623 A1 | 10/2004 | Hydrie et al. | |
| 2007/0030846 A1 | 2/2007 | Szczesniak et al. | |
| 2012/0054346 A1 | 3/2012 | Lee | |
| 2013/0266012 A1* | 10/2013 | Dutta | H04L 45/28 370/392 |
| 2013/0308462 A1 | 11/2013 | Ashida et al. | |
| 2014/0010109 A1 | 1/2014 | Himura et al. | |
| 2014/0056298 A1* | 2/2014 | Vobbilisetty | H04L 12/46 370/355 |
| 2014/0286195 A1* | 9/2014 | Fedyk | H04L 45/02 370/254 |
| 2014/0321323 A1* | 10/2014 | Fedyk | H04L 45/02 370/254 |
| 2014/0362859 A1* | 12/2014 | Addanki | H04L 12/465 370/392 |
| 2015/0063351 A1* | 3/2015 | Moreno | H04L 45/745 370/392 |
| 2016/0119228 A1* | 4/2016 | Gao | H04L 47/2408 370/392 |

OTHER PUBLICATIONS

Q. Zhao et al., "LDP Extensions for Multi Topology Routing", Internet Engineering Task Force, Oct. 14, 2013, 20 pages.
Z. Li et al., "Framework of Network Virtualization Based on MPLS Global Label", Network Working Group, Oct. 21, 2013, 13 pages.
Z. Li et al., "An Architecture of Central Controlled Interior Gateway Protocol (IGP)", Network Working Group, Oct. 21, 2013, 11 pages.

* cited by examiner

| Forwarding Entry of a Virtual Network Topology | Global Label |
|---|---|
| $FIB_1$ | $L_1$ |
| $FIB_2$ | $L_2$ |
| $FIB_3$ | $L_3$ |
| ...... | ...... |
| $FIB_n$ | $L_n$ |

| FIB | Global Label | Outbound Interface | Next Hop Information |
|---|---|---|---|
| $FIB_1$ | $L_1$ | Outbound interface 1 | Node 1 |
| $FIB_2$ | $L_2$ | Outbound interface 2 | Node 2 |
| $FIB_3$ | $L_3$ | Outbound interface 3 | Node 3 |
| ...... | ...... | ...... | ...... |
| $FIB_n$ | $L_n$ | Outbound interface n | Node n | ively redundant trees (Maximally Redundant Trees, MRTs) is: on a network on which hop-by-hop forwarding is performed based on a shortest path first (Shortest Path First, SPF) topology, as shown in FIG. 1A, it is assumed that a network includes nodes A, B, C, D, E, F, G, H, I, J, R, and so on; for a common root node (for example, node H in FIG. 1A), two non-intersecting redundant trees (for example, a topology in FIG. 1B and a topology in FIG. 1C) may be calculated, and the redundant tree in FIG. 1B and the redundant tree in FIG. 1C both include all the nodes A, B, C, D, E, F, G, H, I, J and R, and have the same Root node H, but directional links do not overlap.

PACKET FORWARDING METHOD, CONTROLLER, FORWARDING DEVICE, AND NETWORK SYSTEM

CROSS-REFERENCE TO RELATED APPLICATIONS

This application is a continuation of International Application No. PCT/CN2013/085496, filed on Oct. 18, 2013, which is hereby incorporated by reference in its entirety.

TECHNICAL FIELD

The present invention relates to a packet forwarding method, a controller, a forwarding device, and a system.

BACKGROUND

A principle of maximally redundant trees (Maximally Redundant Trees, MRTs) is: on a network on which hop-by-hop forwarding is performed based on a shortest path first (Shortest Path First, SPF) topology, as shown in FIG. 1A, it is assumed that a network includes nodes A, B, C, D, E, F, G, H, I, J, R, and so on; for a common root node (for example, node H in FIG. 1A), two non-intersecting redundant trees (for example, a topology in FIG. 1B and a topology in FIG. 1C) may be calculated, and the redundant tree in FIG. 1B and the redundant tree in FIG. 1C both include all the nodes A, B, C, D, E, F, G, H, I, J and R, and have the same Root node H, but directional links do not overlap.

With a network formed by nodes A, B, C and D as an example, three topologies may be calculated by using an MRT:

Default topology (referring to FIG. 2A): node A→node B→node C and node A→node D→node C;

First topology (referring to FIG. 2B): node A→node B→node C→node D→node A; and

Second topology (referring to FIG. 2C): node A→node D→node C→node B→node A.

A route in the default topology may be protected by using a backup route in the first topology or the second topology. As shown in FIG. 2D, a route in the default topology is protected by the second topology that is shown in FIG. 2C and calculated by using an MRT. When a directional link from node B to node C encounters a fault, traffic is switched to a directional link from node B to node A in the second topology, and arrives at the destination node C via node 1D.

MRT FRR (MRT Fast ReRoute, MRT fast reroute) includes two forwarding mechanisms. One is forwarding by using Label Distribution Protocol (Label Distribution Protocol, LDP) multi-topology, that is, labels are distributed to routes in the first topology and the second topology in a same way and forwarding is implemented in different topologies by using Multiprotocol Label Switching (Multi-Protocol Label Switching, MPLS) labels; and the other is forwarding through Internet Protocol (Internet Protocol, IP) tunnels, where the MPLS technology is not used in this method and a destination address is reached through an IP tunnel in the first topology or the second topology.

The inventor finds during research that the forwarding mechanisms used in MRT FRR have the following problems:

For forwarding through IP tunnels, multi-topology addresses need to be planned in advance, and a large number of IP tunnels are established and maintained on a network, so that management and maintenance of the network become complex.

Challenges also exist when MRT FRR forwarding is supported by using LDP MT (LDP Multi-Topology, LDP multi-topology): 1. For a same prefix, LDP MT-based MRT FRR requires that labels be allocated separately to three topologies, and a large number of labels need to be used. For an IP-only network, additional LDP MT needs to be deployed to support MRT FRR. The number of route prefixes of an Internet backbone network can reach 400,000 to 500,000. If only LDP MT is used, the number of labels in use may exceed $2^{20}$, that is, existing label space (a label is represented by using 20 bits) may be incapable of meeting an application requirement. 2. For an IP-only network, for ease of operation and maintenance of a network, an operator does not want to introduce a new MPLS protocol (such as the LDP), so that actual deployment of LDP MT-based MRT FRR is also difficult.

SUMMARY

Embodiments of the present invention aim to provide a packet forwarding method, a device, and a network system, to improve maintenance efficiency of MRT FRR.

To achieve the foregoing objective, the embodiments of the present invention provide the following technical solutions.

According to a first aspect, an embodiment of the present invention provides a network system, including at least one controller and a plurality of forwarding devices, where the plurality of forwarding devices forms a plurality of virtual network topologies;

the at least one controller is configured to allocate a global label to each of the plurality of virtual network topologies, and send a binding relationship between the global labels and the plurality of virtual network topologies to the plurality of forwarding devices, where global labels allocated by the controller to different virtual network topologies of the plurality of virtual network topologies are different; and the plurality of forwarding devices is configured to receive the binding relationship between the global labels and the virtual network topologies, and generate, according to the binding relationship, label forwarding entries including a mapping relationship between the global labels and forwarding information bases of the virtual network topologies; and when a first packet received by a forwarding device carries a first global label, the forwarding device finds, by searching according to the first global label, a forwarding information base of a first virtual network topology corresponding to the first global label, and determines that the first packet is to be forwarded by using the forwarding information base of the first virtual network topology, where the first virtual network topology is one of the plurality of virtual network topologies.

In a first possible implementation manner of the first aspect, the plurality of forwarding devices is further configured to:

when a second packet received by the forwarding device does not carry a global label, and the second packet is to be forwarded from a second virtual network topology, the forwarding device encapsulates a second global label into the second packet according to the second global label corresponding to the second virtual network topology, where, on a next hop node, the second global label is directed to a forwarding information base corresponding to the second virtual network topology, and the second virtual network topology is one of the plurality of virtual network topologies.

With reference to the first aspect or the first possible implementation manner of the first aspect, in a second possible implementation manner of the first aspect, the controller includes a label allocating module and a label sending module, where the label allocating module is configured to allocate a global label to each of the plurality of virtual network topologies, where labels allocated to different virtual network topologies of the plurality of virtual network topologies are different; and the label sending module is configured to send, to the plurality of forwarding devices, the binding relationship between the global labels and the virtual network topologies corresponding to the global labels.

With reference to the first aspect, or the first or second possible implementation manner of the first aspect, in a third possible implementation manner of the first aspect, each of the forwarding device includes a receiving module, a label forwarding entry module, and a forwarding module, where the receiving module is configured to receive the binding relationship between the global labels and the virtual network topologies corresponding to the global labels that is sent by the controller;

the label forwarding entry generating module is configured to generate, according to the binding relationship between the global labels and the virtual network topologies, label forwarding entries including a mapping relationship between the global labels and forwarding information bases of the virtual network topologies; and the forwarding module is configured to determine, according to the first global label carried in the received first packet, a first label forwarding entry corresponding to the first global label, to determine that the first packet is to be forwarded from the forwarding information base of the first virtual network topology corresponding to the first global label.

With reference to the third possible implementation manner of the first aspect, in a fourth possible implementation manner of the first aspect, the forwarding device further includes a label adding module; and when a second packet received by the receiving module does not carry a global label, and the second packet is to be forwarded from a second virtual network topology, the forwarding module adds a second global label to the second packet according to the second global label corresponding to a topology ID of the second virtual network topology, where, on a next hop node, the second global label is indexed to a forwarding information base corresponding to the second virtual network topology, and the second virtual network topology is one of the plurality of virtual network topologies.

With reference to the first aspect or the first possible implementation manner of the first aspect, in a fifth possible implementation manner of the first aspect, the controller includes a first processor and a first interface, where the first processor is configured to allocate a global label to each of the plurality of virtual network topologies, where global labels allocated to different virtual network topologies of the plurality of virtual network topologies are different; and the first interface is configured to send, to the plurality of forwarding devices, the binding relationship between the global labels and the virtual network topologies corresponding to the global labels.

With reference to the first aspect, or the first or fifth possible implementation manner of the first aspect, in a sixth possible implementation manner of the first aspect, the forwarding device includes a second interface, a second processor, and a third processor, where the second interface is configured to receive the binding relationship between the global labels and the virtual network topologies corresponding to the global labels that is sent by the controller;

the second processor is configured to generate, according to the binding relationship between the global labels and the virtual network topologies, label forwarding entries including a mapping relationship between the global labels and forwarding information bases of the virtual network topologies; and the third processor is configured to determine, according to the first global label carried in the received first packet, a first label forwarding entry corresponding to the first global label, to determine that the first packet is to be forwarded from the forwarding information base of the first virtual network topology corresponding to the first global label.

With reference to the sixth possible implementation manner of the first aspect, in a seventh possible implementation manner of the first aspect, the forwarding device further includes a fourth processor; and if a second packet received by the second interface does not carry a global label, and the second packet needs to be forwarded from a second virtual network topology, the third processor adds a second global label to the second packet by using the fourth processor and according to the second global label corresponding to a topology ID of the second virtual network topology, where, on a next hop node, the second global label is indexed to a forwarding information base corresponding to the second virtual network topology, and the second virtual network topology is one of the plurality of virtual network topologies.

With reference to the first aspect, or the first, second, third, fourth, fifth, sixth, or seventh possible implementation manner of the first aspect, in an eighth possible implementation manner of the first aspect, the controller is an Interior Gateway Protocol (IGP) server.

With reference to the first aspect, or the first, second, third, fourth, fifth, sixth, seventh, or eighth possible implementation manner of the first aspect, in a ninth possible implementation manner of the first aspect, a global label includes two or more labels.

According to a second aspect, an embodiment of the present invention provides a controller, where the controller is applied to a network system including the controller and a plurality of forwarding devices, and the plurality of forwarding devices forms a plurality of virtual network topologies; and the controller includes a label allocating module and a label sending module, where the label allocating module is configured to allocate a global label to each of the plurality of virtual network topologies, where labels allocated to different virtual network topologies of the plurality of virtual network topologies are different; and the label sending module is configured to send, to the plurality of forwarding devices, a binding relationship between the global labels and the virtual network topologies corresponding to the global labels.

In a first possible implementation manner of the second aspect, the global label includes two or more labels.

According to a third aspect, an embodiment of the present invention provides a controller, where the controller is applied to a network system including the controller and a plurality of forwarding devices, and the plurality of forwarding devices forms a plurality of virtual network topologies; and the controller includes a first processor and a first interface, where the first processor is configured to allocate a global label to each of the plurality of virtual network topologies, where global labels allocated to different virtual network topologies of the plurality of virtual network topologies are different; and the first interface is configured to send, to the plurality of forwarding devices, a binding relationship between the global labels and the virtual network topologies corresponding to the global labels.

In a first possible implementation manner of the third aspect, the global label includes two or more labels.

According to a fourth aspect, an embodiment of the present invention provides a forwarding device, where the forwarding device is applied to a network system including a plurality of forwarding devices and at least one controller, and the plurality of said forwarding devices forms a plurality of virtual network topologies; and the forwarding device comprises a receiving module, a label forwarding entry module, and a forwarding module, where the receiving module is configured to receive a binding relationship between global labels and the plurality of virtual network topologies corresponding to the global labels that is sent by the controller;

the label forwarding entry generating module is configured to generate, according to the binding relationship between the global labels and the virtual network topologies, label forwarding entries including a mapping relationship between the global labels and forwarding information bases of the virtual network topologies; and the forwarding module is configured to determine, according to a first global label carried in a received first packet, a first label forwarding entry corresponding to the first global label, to determine that the first packet is to be forwarded from a forwarding information base of a first virtual network topology corresponding to the first global label.

In a first possible implementation manner of the fourth aspect, the forwarding device further includes a label adding module; and when a second packet received by the receiving module does not carry a global label, and the second packet is to be forwarded from a second virtual network topology, the forwarding module adds a second global label to the second packet according to the second global label corresponding to a topology ID of the second virtual network topology, where, on a next hop node, the second global label is indexed to a forwarding information base corresponding to the second virtual network topology, and the second virtual network topology is one of the plurality of virtual network topologies.

With reference to the fourth aspect, or the first possible implementation manner of the fourth aspect, in a second possible implementation manner of the fourth aspect, the global label includes two or more labels.

According to a fifth aspect, an embodiment of the present invention provides a forwarding device, where the forwarding device is applied to a network system including a plurality of said forwarding devices and at least one controller, and the plurality of said forwarding devices forms a plurality of virtual network topologies; and the forwarding device includes a second interface, a second processor, and a third processor, where the second interface is configured to receive a binding relationship between a global labels and the virtual network topologies corresponding to the global labels that is sent by the controller;

the second processor is configured to generate, according to the binding relationship between the global labels and the virtual network topologies, label forwarding entries including a mapping relationship between the global labels and forwarding information bases of the virtual network topologies; and the third processor is configured to determine, according to a first global label carried in a received first packet, a first label forwarding entry corresponding to the first global label, to determine that the first packet is to be forwarded from a forwarding information base of a first virtual network topology corresponding to the first global label.

In a first possible implementation manner of the fifth aspect, the forwarding device further includes a fourth processor; and if a second packet received by the second interface does not carry a global label, and the second packet needs to be forwarded from a second virtual network topology, the third processor adds a second global label to the second packet by using the fourth processor and according to the second global label corresponding to a topology ID of the second virtual network topology, where, on a next hop node, the second global label is indexed to a forwarding information base corresponding to the second virtual network topology, and the second virtual network topology is one of the plurality of virtual network topologies.

With reference to the fifth aspect, or the first possible implementation manner of the fifth aspect, in a second possible implementation manner of the fifth aspect, the global label includes two or more labels.

According to a sixth aspect, an embodiment of the present invention provides a packet forwarding method, where the method is applied to a network system including at least one controller and a plurality of forwarding devices, and the plurality of forwarding devices forms a plurality of virtual network topologies; and the method includes:

receiving a binding relationship between global labels and the virtual network topologies, and generating, according to the binding relationship, label forwarding entries including a mapping relationship between the global labels and forwarding information bases of the virtual network topologies, where the binding relationship is that the controller allocates a global label to each of the plurality of virtual network topologies, and sends, to the plurality of forwarding devices, the binding relationship between the global labels and the virtual network topologies corresponding to the global labels, where global labels allocated by the controller to different virtual network topologies of the virtual network topologies are different; and when a first packet received by a forwarding device carries a first global label, finding, by the forwarding device by searching according to the first global label, a first label forwarding entry corresponding to the first global label, to determine that the first packet is to be forwarded from the first label forwarding entry of a first virtual network topology corresponding to the first global label, where the first virtual network topology is one of the plurality of virtual network topologies.

In a first possible implementation manner of the sixth aspect, that the at least one controller sends the binding relationship to the forwarding devices is specifically that: the at least one controller sends the binding relationship to forwarding devices within an (IGP) domain by extending an Interior Gateway Protocol (IGP).

With reference to the sixth aspect, in a second possible implementation manner of the sixth aspect, if a second packet received by a forwarding device does not carry a global label, and the second packet is to be forwarded from a second virtual network topology, the forwarding device adds a second global label to the second packet according to the second global label corresponding to a topology ID of the second virtual network topology, where, on a next hop node, the second global label is indexed to a forwarding information base corresponding to the second virtual network topology, and the second virtual network topology is one of the plurality of virtual network topologies.

With reference to the sixth aspect, or the first or second possible implementation manner of the sixth aspect, in a third possible implementation manner of the sixth aspect, the global label includes two or more labels.

According to the controller, the forwarding device, and the packet forwarding method that are provided in the embodiments of the present invention, MPLS global labels are allocated to a plurality of IGP topologies by extending an IGP, to implement MPLS network virtualization. The method can be applied to MRT FRR forwarding and achieve the following beneficial effect: when MRT FRR forwarding of an IP network is implemented by using global labels, only an IGP needs to be extended and LDP does not need to be deployed. By using global labels, MRT FRR can be implemented by using only a few global labels that identify virtual network topologies, which simplifies network virtualization and MRT FRR deployment.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the present invention more comprehensible, the following describes the technical solutions in detail according to the embodiments of the present invention with reference to the accompanying drawings in the embodiments of the present invention. Apparently, the embodiments in the following description are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, Multiprotocol Label Switching (MultiProtocol Label Switch, MPLS) network virtualization is implemented by extending an Interior Gateway Protocol (Interior Gateway Protocol, IGP), to resolve such problems existing in MRT FRR (maximally redundant trees fast reroute) forwarding mechanisms as planning of IP (Internet Protocol) addresses and a large number of labels in use.

An IGP is a protocol dedicated to exchanging routing information between gateways within an autonomous network system (for example, an autonomous network system within a range of a local community). The Internet Protocol (Internet Protocol, IP) or another network protocol usually determines, according to the routing information, how a data flow is transmitted. IGPs include: Routing Information Protocol (Routing Information Protocol, RIP), Open Shortest Path First (Open Shortest Path First, OSPF), Interior Gateway Routing Protocol (Interior Gateway Routing Protocol, IGRP), Enhanced Interior Gateway Routing Protocol (Enhanced Interior Gateway Routing Protocol, EIGRP), Intermediate System to Intermediate System (Intermediate System to Intermediate System, IS-IS), and the like.

Figure 1A:
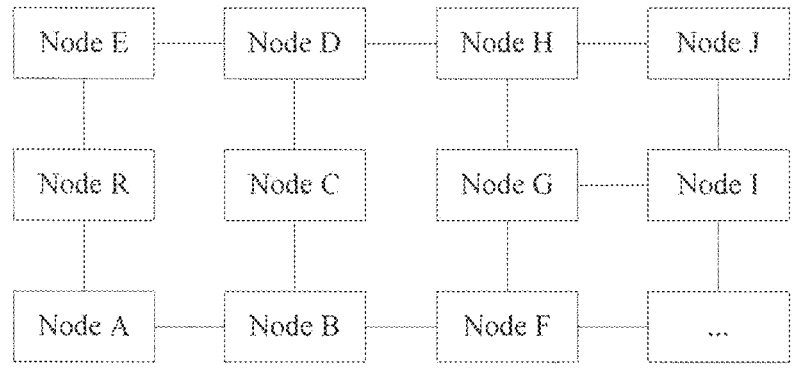
FIG. 1A is a diagram of a default topology of a network in the prior art.
Figure 1B:
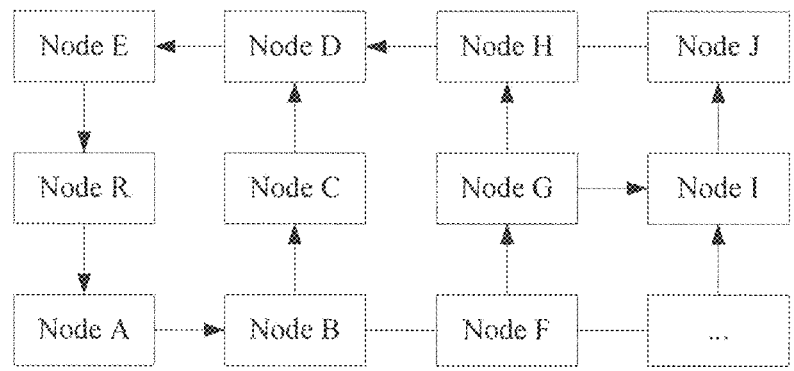
FIG. 1B is a diagram of a directional topology of the network shown in FIG. 1A.
Figure 1C:
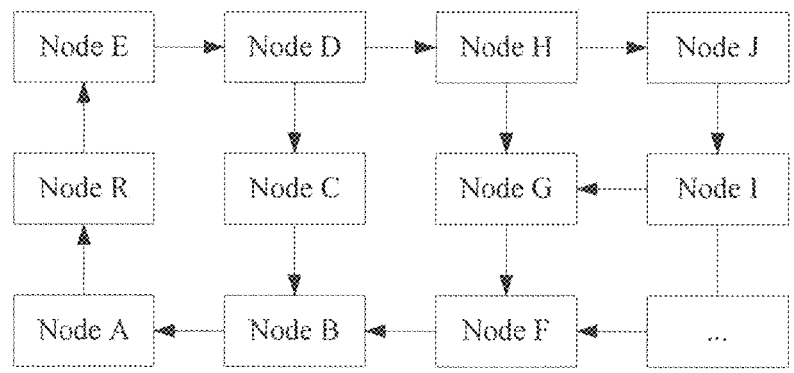
FIG. 1C is a diagram of another directional topology of the network shown in FIG. 1A.
Figure 2A:
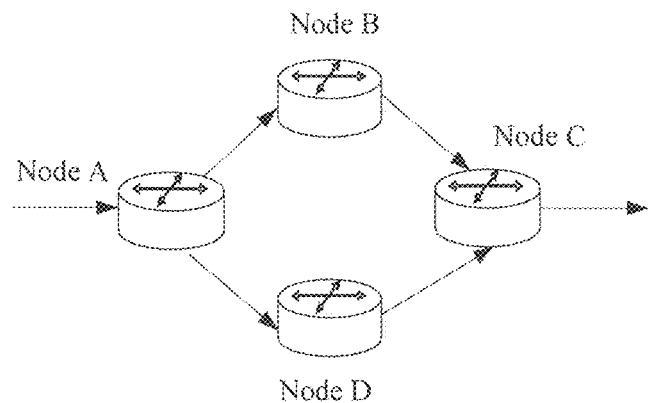
FIG. 2A is a diagram of a default topology of a network in the prior art.
Figure 2B:
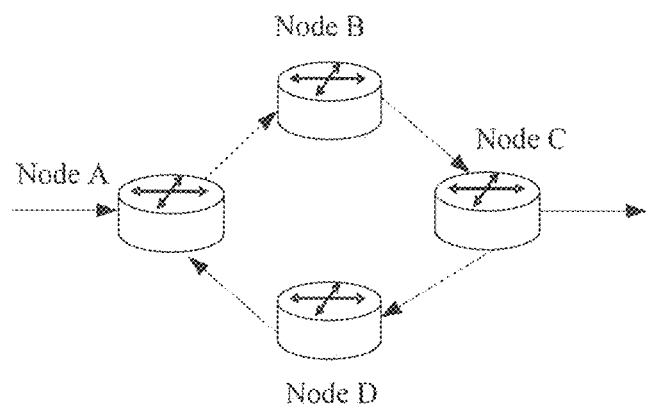
FIG. 2B is a diagram of a directional topology of the network shown in FIG. 2A.
Figure 2C:
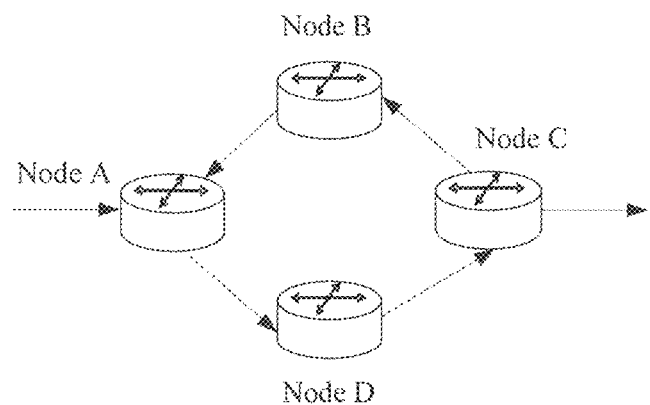
FIG. 2C is a diagram of another directional topology of the network shown in FIG. 2A.
Figure 2D:
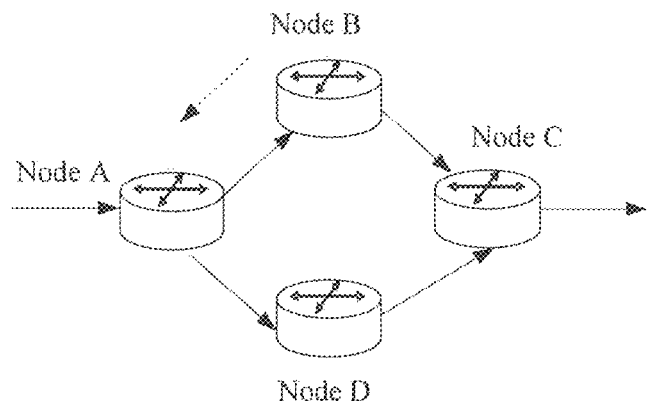
FIG. 2D is a schematic diagram of switching caused by a link fault in the default topology of the network shown in FIG. 2A.
Figure 3:
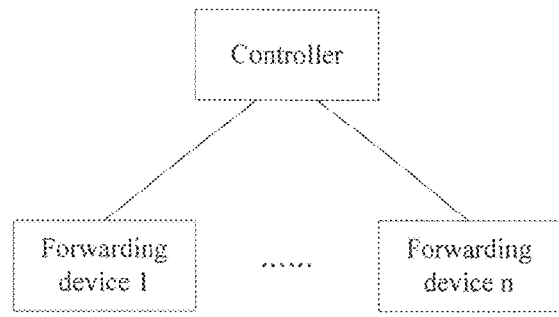
FIG. 3 is a schematic structural diagram of a network system according to an embodiment of the present invention.

As shown in FIG. 3, a network system according to an embodiment of the present invention includes at least one controller and a plurality of forwarding devices, where the plurality of forwarding devices forms a plurality of virtual network topologies.

The at least one controller is configured to allocate a global label to each of the plurality of virtual network topologies, and send a binding relationship between global labels and the virtual network topologies to the plurality of forwarding devices. For example, N forwarding devices form X virtual network topologies, and a controller needs to allocate a global label to each virtual network topology, where global labels allocated to different virtual network topologies are different. That is, a label that is allocated by the controller to a virtual network topology with a topology ID of $TID_1$ is $L_1$, and a label that is allocated by the controller to a virtual network topology with a topology ID of $TID_2$ is $L_2$, where $L_1$ and $L_2$ are different. After the controller allocates the global labels to the virtual network topologies, topology IDs of the virtual network topologies are bound to or associated with the global labels allocated to the virtual network topologies to form a binding relationship table shown in Table 1. As shown in Table 1, each binding relationship entry in the binding relationship table includes a topology ID of a virtual network topology and a global label allocated to the virtual network topology.

TABLE 1

Binding relationship table

| Topology ID of a Virtual Network Topology | Allocated Global Label |
|---|---|
| $TID_1$ | $L_1$ |
| $TID_2$ | $L_2$ |
| $TID_3$ | $L_3$ |
| ... | ... |
| $TID_n$ | $L_n$ |

The plurality of forwarding devices is configured to receive the binding relationship between the global labels and the virtual network topologies, and generate, according to the binding relationship, label forwarding entries including a mapping relationship between the global labels and forwarding information bases of the virtual network topologies. When a packet received by a forwarding device carries a global label (for example, a first global label), the forwarding device finds, by searching according to the first global label, a first label forwarding entry corresponding to the first global label, to determine that the packet is to be forwarded from a forwarding information base of a first virtual network topology corresponding to the first global label.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an Internet Protocol (Internet Protocol, IP) forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$.

The "forwarding devices" and "clients" mentioned in the embodiments of the present invention all support a multi-topology (multi-topology) technology, and FIBs (Forwarding Information Base) can be configured on a plurality of topologies, that is, there is a plurality of forwarding instances (forwarding instance) on each of the "forwarding devices"/"clients". Each forwarding instance corresponds to a virtual network topology (virtual network topology).

As shown in Table 2, the label forwarding entry may include a global label and a forwarding information base of a virtual network topology corresponding to the global label.

When a forwarding device receives a packet, if the received packet carries a global label, for example, $L_1$, the forwarding device searches, according to the global label, for a label forwarding entry corresponding to the global label, finds a routing and forwarding information base corresponding to the virtual network topology, for example, $FIB_1$, from the label forwarding entry corresponding to the global label, and then, forwards the packet according to the $FIB_1$.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an IP forwarding manner in a default network topology, and a forwarding entry of an FIB (Forwarding Information Base) of a default topology in a forwarding device has a backup path in a virtual network topology. When the forwarding device receives an IP packet in the default topology, and the packet cannot be forwarded to a next hop due to a fault of a link or a node, the forwarding device determines, according to the forwarding entry of the default topology, a topology ID (for example, $TID_2$) of the virtual network topology in which the backup path is located, adds a global label (for example, $L_1$) corresponding to the topology ID (for example, $TID_1$) to the packet, and forwards the packet according to the backup path in the virtual network topology corresponding to the added global label.

TABLE 2

Label forwarding information base

| Global Label | Forwarding Information Base of a Virtual Network Topology |
|---|---|
| $L_1$ | $FIB_1$ |
| $L_2$ | $FIB_2$ |
| $L_3$ | $FIB_3$ |
| ... | ... |
| $L_n$ | $FIB_n$ |

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Optionally, the forwarding device is a router or a switch.

Optionally, the controller may be a server or a router.

Figure 4:
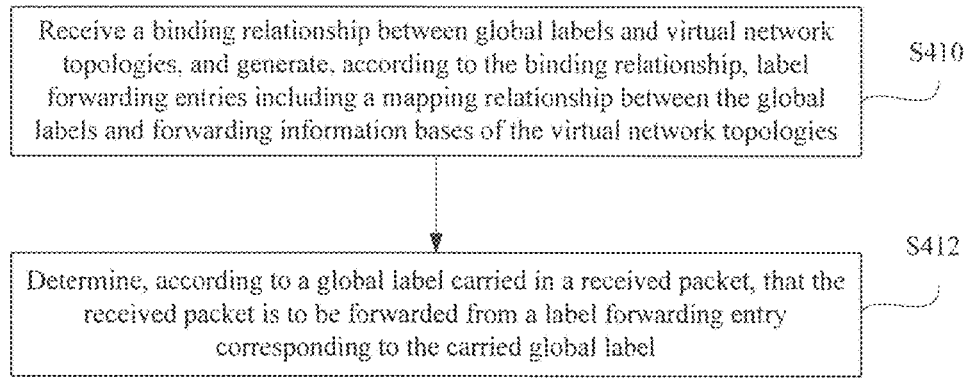
FIG. 4 is a schematic flowchart of a packet forwarding method according to an embodiment of the present invention.

A packet forwarding method according to an embodiment of the present invention is shown in FIG. 4. The method is applied to a network system including at least one controller and a plurality of forwarding devices, where the plurality of forwarding devices forms a plurality of virtual network topologies, and the method includes:

S410. Receive a binding relationship between global labels and the virtual network topologies, and generates, according to the binding relationship, label forwarding entries including a mapping relationship between the global labels and forwarding information bases of the virtual network topologies, where the binding relationship is that the controller allocates a global label to each of the plurality of virtual network topologies, and sends, to the plurality of forwarding devices, the binding relationship between the global labels and the virtual network topologies corresponding to the global labels. For example, N forwarding devices form X virtual network topologies, and a controller needs to allocate a global label to each virtual network topology, where global labels allocated by the controller to different virtual network topologies of the virtual network topologies are different.

S412. Determine, according to a global label carried in a received packet, that the received packet is to be forwarded from a label forwarding entry corresponding to the carried global label.

When the packet received by a forwarding device carries a global label (for example, a first global label), the forwarding device finds, by searching according to the first global label, a first label forwarding entry corresponding to the first global label, to determine that the packet is to be forwarded from the first label forwarding entry of a first virtual network topology corresponding to the first global label.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an IP forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Optionally, that the at least one controller forwards the binding relationship to the plurality of forwarding devices is specifically that: the at least one controller sends the binding relationship to IGP clients within an IGP domain by extending an IGP.

The following embodiment is described by using an example that a controller and a forwarding device are located within an IGP domain.

Figure 5:
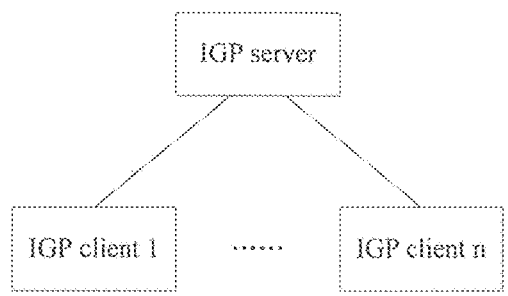
FIG. 5 is a schematic structural diagram of another network system according to an embodiment of the present invention.

As shown in FIG. 5, a network architecture according to an embodiment of the present invention includes one or more IGP servers (server) and one or more IGP clients (client). An IGP server serves as a controller, and an IGP client is a forwarding device within an IGP domain, where the forwarding device may be a device with a forwarding function, such as a router or a switch. The one or more IGP servers and the plurality of IGP clients are located in the same IGP domain. The plurality of IGP clients forms a plurality of virtual network topologies. The at least one IGP server is configured to allocate a global label to each of the plurality of virtual network topologies, and send, to the plurality of IGP clients, a binding relationship between each global labels and a virtual network topology that correspond to the global label and are located within the IGP domain. For example, N forwarding devices form X virtual network topologies, and a controller needs to allocate a global label to each virtual network topology, where global labels allocated by the controller to different virtual network topologies are different.

The plurality of IGP clients is configured to receive the binding relationship between the global labels and the virtual network topologies, and generate, according to the binding relationship, label forwarding entries including a mapping relationship between the global labels and forwarding information bases of the virtual network topologies; and when a packet received by a IGP client carries a global label (for example, a first global label), the forwarding device finds, by searching according to the first global label, a first label forwarding entry corresponding to the first global label, to determine that the packet is to be forwarded by using a forwarding information base of a first virtual network topology corresponding to the first global label.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label $L_2$ is indexed to a forwarding in formation base corresponding to the second virtual network topology.

In an MRT FRR scenario, a packet entering a network is forwarded in an IP forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$. For composition and implementation of the label forwarding entry of a virtual network topology, refer to content shown in Table 2.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Figures 6, 7A:
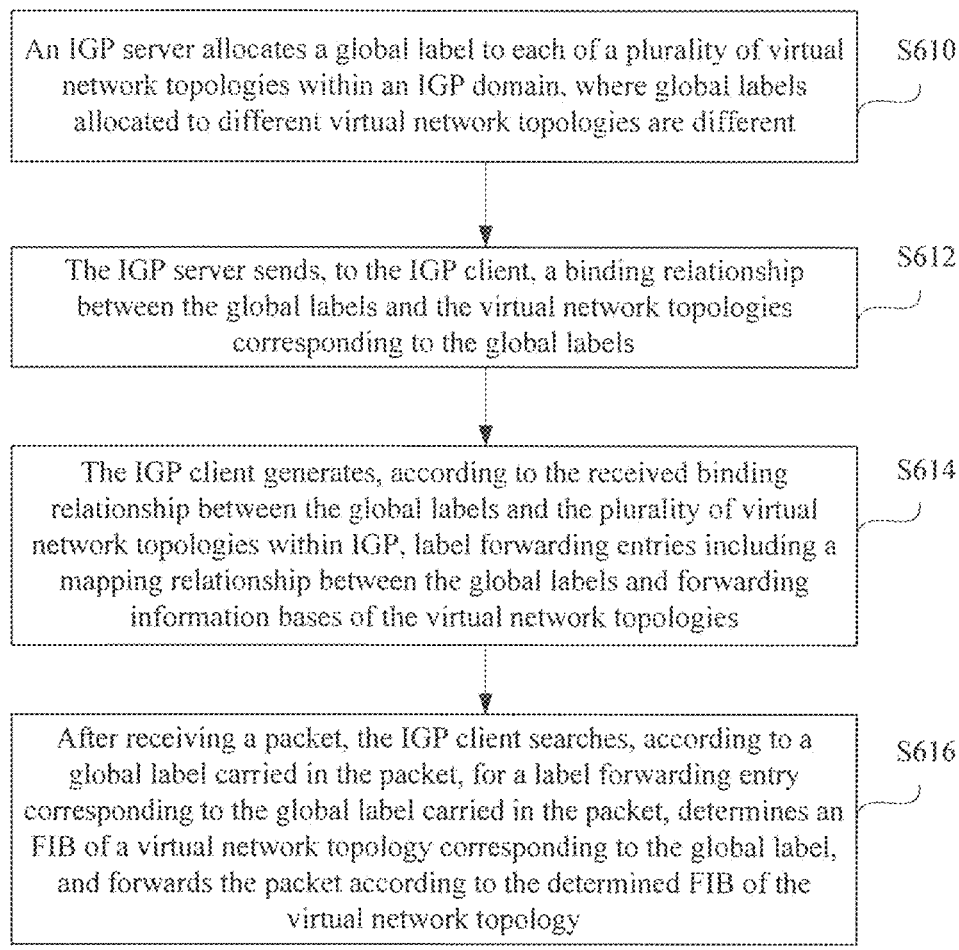
FIG. 6 is a schematic flowchart of a packet forwarding method according to an embodiment of the present invention.
FIG. 7A is a schematic diagram of a TLV format according to an embodiment of the present invention.

Based on the network architecture shown in FIG. 5, a packet forwarding method according to an embodiment of the present invent ion, as shown in FIG. 6, includes:

S610. An IGP server allocates a global label to each of a plurality of virtual network topologies within an IGP domain, where global labels allocated to different virtual network topologies are different.

One or more physical topologies may be included within an IGP domain. A plurality of logical topologies (virtual network topologies) may be deployed on these physical topologies as required. Multi-topology routing (Multi Topology Routing, MTR) indicates that a plurality of virtual network topologies independently runs within an autonomous system, where each virtual network topology independently maintains a routing table and forwards traffic, and each route prefix may belong to a plurality of virtual network topologies. Multi-topology routing implements topology-level traffic scheduling, and when a packet is forwarded, a topology is selected prior to a path.

A multi-topology function supported by an IGP can independently implement, by means of the IGP, an IGP routing function within each configured virtual network topology. When an IGP supports multi-topology, each virtual network topology is equivalent to a routing domain, to ensure synchronization of state information within a topology, perform topology route calculation, and support a routing extension function to be normally executed in each topology.

With an extension attribute of IGP MTR, multi-topology division is performed on each IGP basic function to form a multi-topology model within an IGP process. Each topology is like an independent IGP process, which can independently maintain link state information, independently calculate a shortest path and update an IGP routing table, and finally, participate in an optimal selection together with routes advertised by another protocol, to obtain a topology routing table.

The IGP server allocates a global label to each virtual network topology within the IGP domain, that is, one global label is used to identify one of the plurality of virtual topologies within the IGP domain.

There may be one IGP server, or there may be a server group formed by a plurality of IGP servers, and load sharing can be performed between the plurality of IGP servers.

S612. The IGP server sends, to an IGP client, a binding relationship between the global labels and the virtual network topologies corresponding to the global labels.

A controller within the IGP domain may send, by extending an IGP and to forwarding devices within the IGP domain, the binding relationship between the global labels and the virtual network topologies corresponding to the global labels.

FIG. 7A is an instance of MPLS network virtualization implemented by extending an IGP. Herein, an extended tag-length-value (Tag-Length-Value, TLV) is used to indicate a binding relationship between a plurality of IGP topologies and MPLS global labels, where a topology ID (Topology ID, TID) is used to identify each of the plurality of IGP topologies, and a Label is used to indicate a value of an MPLS global label.

The IGP server allocates a global label to each virtual network topology within the IGP domain, that is, a topology ID of each virtual network topology within the IGP domain corresponds to one global label.

Specifically, conventional MPLS LDP does not support allocation of global labels. Therefore, during allocation of global labels, the IGP server collects label capabilities (that is, ranges of label values that can be allocated by the IGP clients) of all the IGP clients, and calculates label space shared by all the IGP clients. The label space shared by all the IGP clients may be reserved to serve as global label allocation space.

Figure 7B:
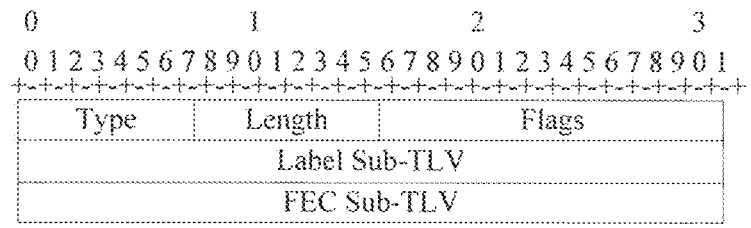
FIG. 7B is a schematic diagram of a format of a label mapping TLV according to an embodiment of the present invention.
Figure 7C:
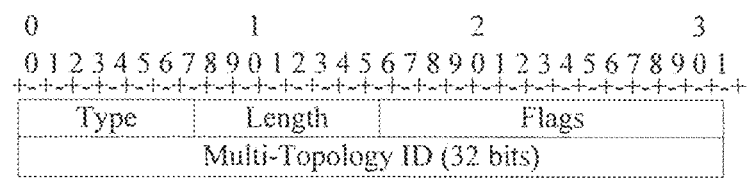
FIG. 7C is a schematic diagram of a format of an MPLS multi-topology sub-TLV according to an embodiment of the present invention.
Figure 7D:
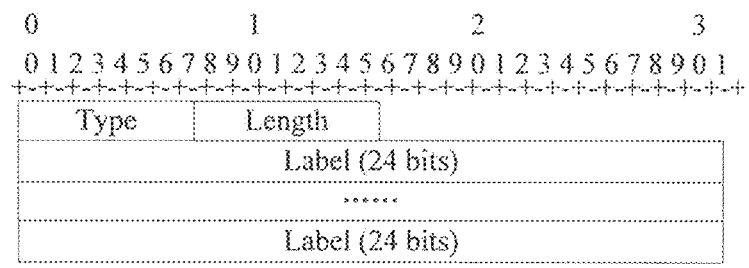
FIG. 7D is a schematic diagram of a format of a global label sub-TLV according to an embodiment of the present invention.

Optionally, as shown in FIG. 7D, an existing range of MPLS label values, that is, 0 to ($2^{20}-1$), may be used to allocate a plurality of labels to one virtual network topology, a label stack formed by combining the plurality of labels that is allocated forms a global label, and the global label is used to identify the virtual network topology. For example, if a plurality of local labels, $L_{n1}$, $L_{n2}$, and $L_{n3}$, is allocated to a virtual network topology with a topology ID of $TID_n$, a global label $L_n$ formed by the plurality of local labels, $L_{n1}+L_{n2}+L_{n3}$, may be used to identify the virtual network topology with the topology ID of $TID_n$; and correspondingly, a binding relationship entry between the topology ID of the virtual network topology and the global label allocated to the virtual network topology may be <$TID_n$, $L_{n1}$+$L_{n2}$+$L_{n3}$>.

The IGP server sends label allocation information to an IGP client, where the label allocation information includes a TLV shown in FIG. 7A or FIG. 7D. The TLV indicates a binding relationship between a plurality of IGP topologies and MPLS global labels, where a topology ID (Topology ID, TID) is used to identify each of the plurality of IGP topologies, and a Label is used to indicate a value of an MPLS global label.

When the OSPF protocol is run between a controller and a forwarding device in a network, the controller allocates a global label to each of a plurality of virtual network topologies in an OSPF domain, and sends, to the forwarding device, a binding relationship between global labels and the virtual network topologies corresponding to the global labels. The controller may send, to the forwarding device and by constructing first link state advertisement data LSA (Link State Advertisement, LSA), the binding relationship between the global labels and the virtual network topologies corresponding to the global labels. The first LSA includes the binding relationship between the global labels of the plurality of virtual network topologies within the OSPF domain and the virtual network topologies corresponding to the global labels.

Optionally, the controller sends, by using a TLV in the first LSA, the binding relationship between the global labels and the virtual network topologies to forwarding devices within the OSPF domain. When receiving the first LSA, a forwarding device generates, according to the binding relationship between the global labels and the virtual network topologies corresponding to the global labels, label forwarding entries including a mapping relationship between the global labels and forwarding information bases of the virtual network topologies, where each label forwarding entry can be indexed by using the global label to a forwarding information base of a specific virtual network topology. Therefore, when a packet received by the forwarding device carries a global label, the forwarding device may determine, according to the carried global label, that the packet is to be forwarded from a forwarding information base of a corresponding virtual network topology. The TLV may be a TLV shown in FIG. 7A or FIG. 7D.

When the IS-IS protocol runs between a controller and a forwarding device in a network, the controller allocates a global label to each of a plurality of virtual network topologies in an ISIS domain, and sends, to the forwarding device, a binding relationship between the plurality of topologies and the global labels. The controller may send, to the forwarding device and by constructing a first link state packet LSP (Link-state PDU), the binding relationship between the global labels and the virtual network topologies corresponding to the global labels. The first LSP includes the binding relationship between the global labels of the plurality of virtual network topologies within the ISIS domain and the virtual network topologies corresponding to the global labels.

Optionally, the controller sends, by using a TLV in the first LSP, the binding relationship between the global labels and the virtual network topologies corresponding to the global labels to forwarding devices within the ISIS domain. When receiving the first LSP, a forwarding device acquires the binding relationship between the global labels and the virtual network topologies corresponding to the global labels, and generates, according to the binding relationship, label forwarding entries including a mapping relationship between the global labels and forwarding information bases of the virtual network topologies, where each label forwarding entry is indexed by using the global label to a forwarding information base of a specific virtual network topology. Therefore, when a packet received by the forwarding device carries a global label, the forwarding device may determine, according to the carried global label, that the packet is to be forwarded from a forwarding information base of a corresponding virtual network topology. The TLV may be a TLV shown in FIG. 7A or FIG. 7D. The TLV may also be a label mapping TLV shown in FIG. 7B. As shown in FIG. 7B, the label mapping TLV includes one or more label sub-TLVs (Label Sub-TLV) and one or more forwarding equivalence class TLVs (FEC Sub-TLV). A Label Sub-TLV includes a value of a global label that is allocated by the controller to a virtual network topology, and an FEC Sub-TLV includes a forwarding equivalence class allocated to the global label. The FEC Sub-TLV may be an MPLS multi-topology sub-TLV shown in FIG. 7C, where a Multi-Topology ID includes an ID of a virtual network topology corresponding to the allocated global label.

The "global label" mentioned in the embodiments of the present invention may be represented by a label stack formed by a plurality of labels carried in a global label sub-TLV (Global Label Sub-TLV) shown in FIG. 7D. The label stack is used to identify a virtual network topology. As shown in FIG. 7D, the Global Label Sub-TLV includes two or more labels, where label values of the labels are within an existing label range 0 to ($2^{20}$-1) and the labels may be local labels or global labels. A plurality of labels included in label fields (Label Field) forms a label stack. Each label field includes a label value with a length of 24 bits, where most significant 20 bits are used to indicate a label value and least significant 4 bits are a stack bottom flag, and values of least significant 4 bits in a last label field are set to 1. The number of global label values formed by combining label stacks in the Global Label Sub-TLVs may be greater than $2^{20}$, that is, an existing MPLS label range is extended. If there is only one label field, this number may be consistent with that in existing MPLS label allocation, that is, 16 to ($2^{20}$-1).

S614. The IGP client generates, according to the received binding relationship between the global labels and the plurality of virtual network topologies within the IGP domain, label forwarding entries including a mapping relationship between the global labels and forwarding information bases of the virtual network topologies.

Figures 8, 9A:
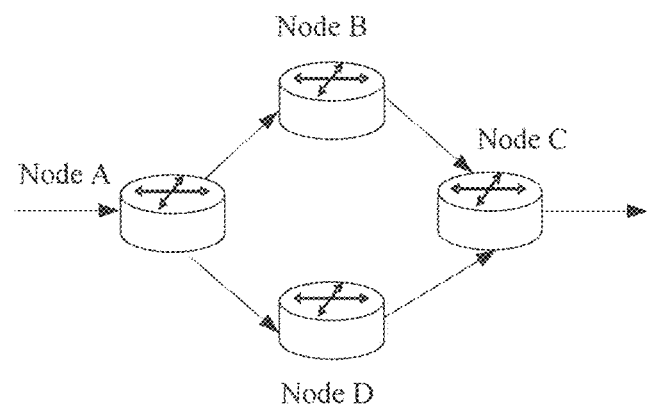
FIG. 8 is a schematic diagram of composition of a forwarding information base of a virtual network topology according to an embodiment of the present invention.
FIG. 9A is a diagram of a default topology of a network in the prior art.

A forwarding device within the IGP domain generates, according to the received binding relationship between the global labels and the virtual network topologies, label forwarding entries including a mapping relationship between the global labels and forwarding information bases of the virtual network topologies, where each label forwarding entry is indexed by a global label to a forwarding information base of a specific virtual network topology. As shown in FIG. 8, the label forwarding entry may include a global label and an FIB of a virtual network topology corresponding to the global label. For example, for a first virtual network topology that has a topology ID of $TID_1$ and corresponds to a first global label $L_1$, a forwarding information base $FIB_1$ of the first virtual network topology are configured on the forwarding device, when a packet received by the forwarding device carries the first global label $L_1$, the forwarding device searches for a first label forwarding entry corresponding to the global label $L_1$, and determines the forwarding information base $FIB_1$ of the first virtual network topology corresponding to the global label $L_1$, and then forwards the packet according to the $FIB_1$ of the first virtual network topology.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label is indexed to a forwarding in formation base corresponding to the second virtual network topology.

In an MRT FRR scenario, a packet entering a network is forwarded in an Internet Protocol (Internet Protocol, IP) forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$.

S616. After receiving a packet, an IGP client searches, according to a global label carried in the packet, for a label forwarding entry corresponding to the global label carried in the packet, determines an FIB of a virtual network topology corresponding to the global label, and forwards the packet according to the determined FIB of the virtual network topology.

After receiving the packet, the IGP client obtains, from the label forwarding entry and by querying according to the label forwarding entry corresponding to the global label carried in the packet, the FIB of the virtual network topology corresponding to the global label carried in the packet, and forwards the packet according to the determined FIB of the virtual network topology.

If the packet received by the forwarding device does not carry a global label, and the packet needs to be forwarded from a virtual network topology (for example, a second virtual network topology), the forwarding device adds a second global label $L_2$ to the packet according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an Internet Protocol (Internet Protocol, IP) forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$.

With a network formed by nodes A, B, C and D as an example, three topologies may be calculated by using an MRT:

Default topology (referring to FIG. 9A): node device A→node device B→node device C and node device A→node device D→node device C;

First virtual network topology (referring to FIG. 9B): node device A→node device B→node device C→node device D→node device A; and Second virtual network topology (referring to FIG. 9C): node device A→node device D→node device C→node device B→node device A.

Figure 9B:
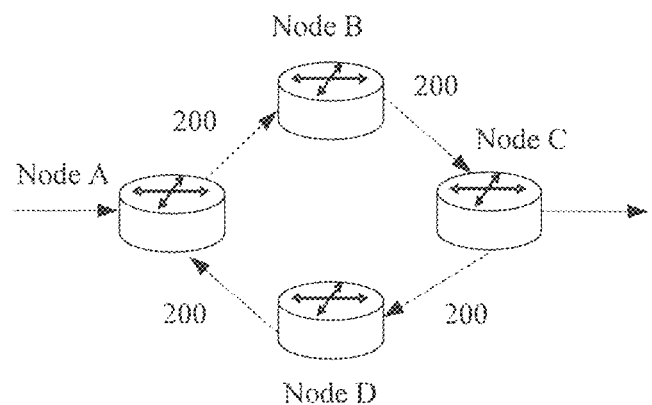
FIG. 9B is a diagram of a directional topology of the network shown in FIG. 9A.
Figure 9C:
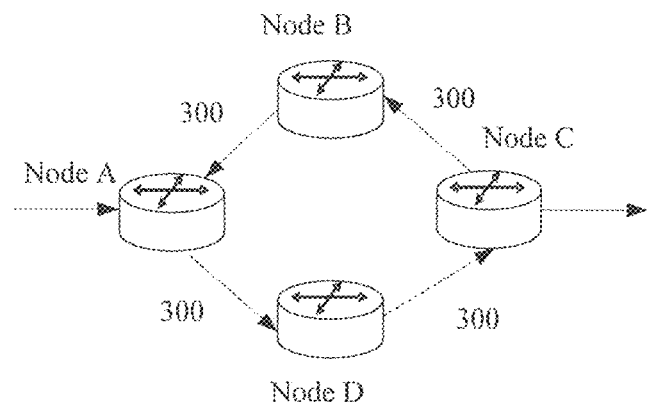
FIG. 9C is a diagram of another directional topology of the network shown in FIG. 9A.

As shown in FIG. 9A to FIG. 9D, by using an embodiment in which global labels are allocated to a plurality of IGP topologies, global labels can be allocated to the first virtual network topology (referring to FIG. 9B) and the second virtual network topology (referring to FIG. 9C) in MRT FRR for identification (in FIG. 9B, a label 200 is used to identify the first virtual network topology, and in FIG. 9C, a global label 300 is used to identify the second virtual network topology). In this way, when a packet is forwarded, a label forwarding entry of a forwarding device can be searched for according to a global label carried in the packet, so that an FIB of a virtual network topology corresponding to the global label carried in the packet is obtained, and the packet is directed to the FIB of the virtual network topology corresponding to the global label for forwarding. For example, node device A receives a first packet, where a global label carried in the first packet is 200, queries a label forwarding entry of node device A according to the global label 200, and determines that an FIB corresponding to the global label 200 is $FIB_{200}$. Then, node device A forwards the first packet according to the routing table $FIB_{200}$ of the first virtual network topology corresponding to the global label 200. Similarly, if the global label carried in the first packet is 300, node device A queries a label forwarding entry of node device A according to the global label 300, finds that an FIB corresponding to the global label 300 is $FIB_{300}$, and then forwards the first packet according to $FIB_{300}$ of the second virtual network topology corresponding to the global label 300.

Figure 9D:
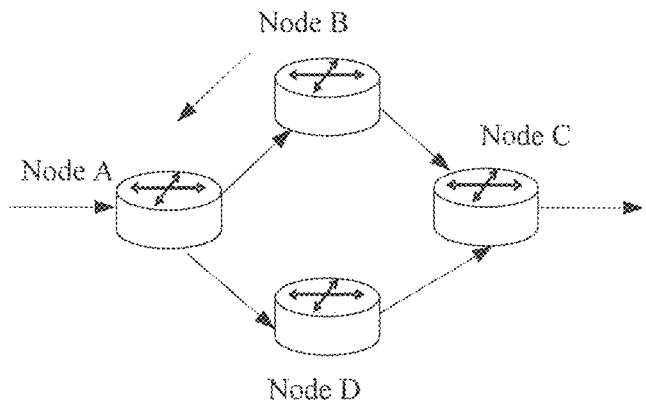
FIG. 9D is a schematic diagram of switching caused by a link fault in the default topology of the network shown in FIG. 9A.

A route for a packet in the default topology shown in FIG. 9A may be protected by using a backup route in the first virtual network topology shown in FIG. 9B or the second virtual network topology shown in FIG. 9C. A route in the default topology shown in FIG. 9D is protected by the second virtual network topology that is shown in FIG. 9C and obtained by calculating by using an MRT. When an IP packet, for example, an IP packet P, is sent from node device A to node device D, the IP packet P arrives at node device B from node device A according to a forwarding information base of the default topology, and if node device B detects a fault on a directional path (node device B→node device C) between node device B and node device C, node device B adds a global label 300 to the IP packet P, so that traffic is switched to a directional link from node device B to node device A in the second virtual network topology. Then, the IP packet P arrives at the destination node device C via node device D, that is, the packet P is sent to node device C along the following path: node device A→node device B→node device D→node device C.

Optionally, in the embodiment, a local label may be an MPLS label.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Figure 10:
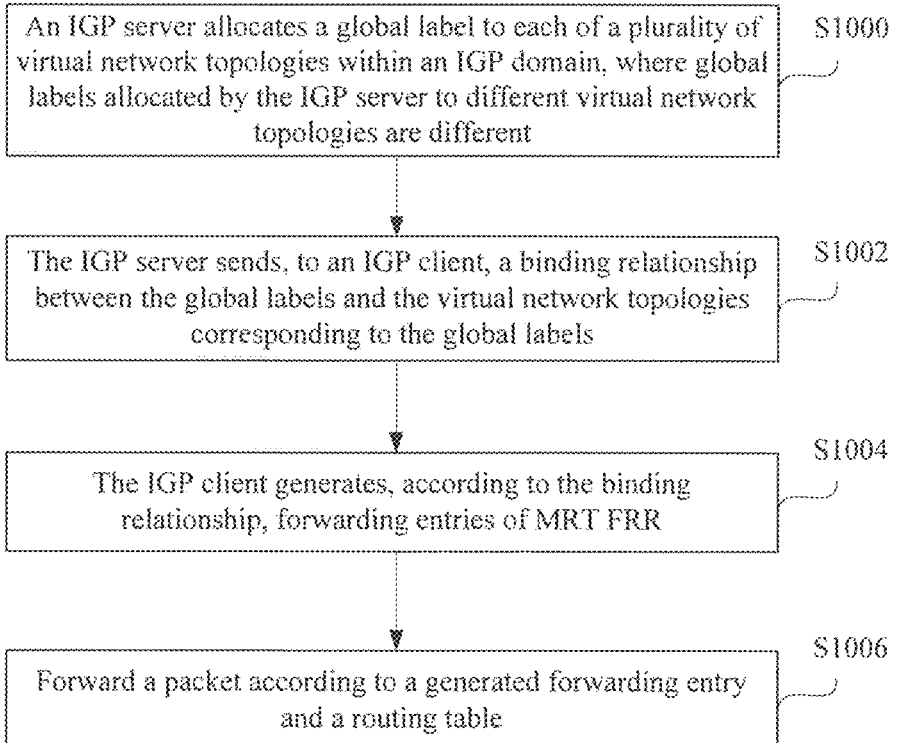
FIG. 10 is a schematic flowchart of another packet forwarding method according to an embodiment of the present invention.

Based on the network architecture shown in FIG. 5, another packet forwarding method according to an embodiment of the present invention is shown in FIG. 10, where the method includes:

S1000. An IGP server allocates a global label to each of a plurality of virtual network topologies within an IGP domain, where global labels allocated by the IGP server to different virtual network topologies are different.

The IGP server allocates a global label to each virtual network topology within the IGP domain, that is, one global label is used to identify one virtual topology of the plurality of topologies within the IGP domain. There may be one IGP server, or there may be a server group formed by a plurality of IGP servers, and load sharing can be performed between the plurality of IGP servers.

S1002. The IGP server sends, to an IGP client, a binding relationship between the global labels and the virtual network topologies corresponding to the global labels.

S1004. The IGP client generates, according to the binding relationship, forwarding entries of MRT FRR.

Figures 11, 12:
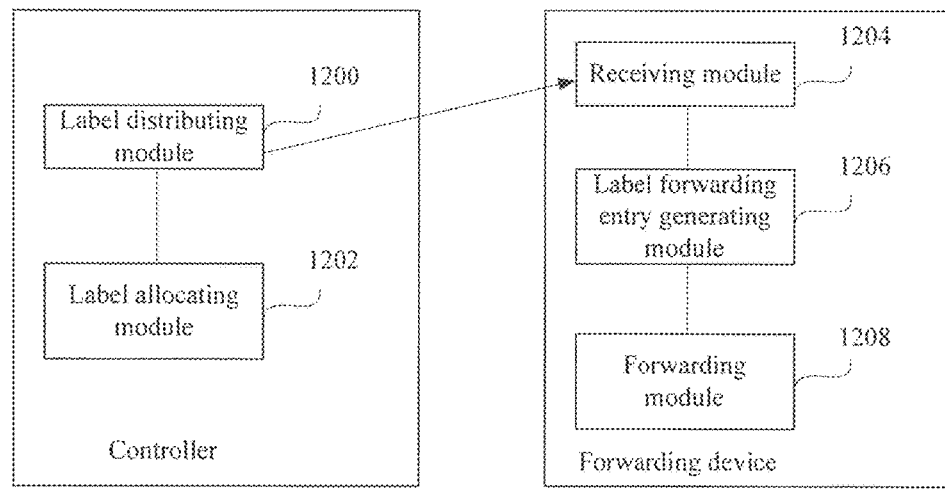
FIG. 11 is a schematic diagram of composition of an MPLS forwarding entry according to an embodiment of the present invention.
FIG. 12 is a schematic structural diagram of another network system according to an embodiment of the present invention.

The IGP client calculates a backup path by using an MRT for an IP route in a default topology according to the received binding relationship between the global labels and the plurality of virtual network topologies within the IGP domain, and generates the forwarding entries of MRT FRR. The backup path is used, when a primary path in the default topology is faulty or interrupted, a last node device (an IGP client) of normal forwarding on the primary path adds a global label identifying a virtual network topology in which the backup path is located, so that the packet can be switched to the virtual network topology in which the backup path is located, and an IGP client that receives the packet in the backup path determines, according to the global label carried in the packet, an FIB of the virtual network topology identified by using the global label, and forwards the packet according to the determined FIB. Forwarding on the backup path is performed by using the first virtual network topology shown in FIG. 9B or the second virtual network topology shown in FIG. 9C. When a routing and forwarding entry is generated, for a specific IP prefix, forwarding is performed by using a common IP route on the primary path that is located in the default topology. For a backup path that is located in another virtual network topology, a label forwarding entry of a virtual network topology corresponding to a global label is generated according to the binding relationship between the global labels and the virtual network topologies that is sent by the IGP server, and the label forwarding entry includes: the global label and an FIB of the virtual network topology corresponding to the global label. As shown in FIG. 11, the label forwarding entry of the virtual network topology may include a global label, and outbound interface and next hop information. The global label is used to identify the first virtual network topology or the second virtual network topology in which the backup path is located, which specifically depends on whether the backup path is located in the first virtual network topology or the second virtual network topology. If the backup path is located in the first virtual network topology, the global label is used to identify the first virtual network topology; if the backup path is located in the second virtual network topology, the global label is used to identify the second virtual network topology. The outbound interface and the next hop are an outbound interface and a next hop that are used for backup in a corresponding backup path calculated by using an MRT.

Routing and forwarding information bases (FIB) of two virtual network topologies (the first virtual network topology and the second virtual network topology) may also be generated by calculating by using an MRT, where each FIB entry matches an IP prefix with a global label identifying a virtual network topology, and an outbound interface and a next hop).

S1006. Forward a packet according to a generated forwarding entry and a routing table.

(1) When receiving an IP packet, a forwarding device forwards the IP packet according to a routing table of a default topology. When detecting a fault, the forwarding device adds to the packet a global label identifying a virtual network topology in which a backup path is located, and forwards the IP packet by using a forwarding information base of the virtual network topology in which the backup path is located, which implements traffic protection switching. In this case, the forwarding device adds, to the IP packet and according to the forwarding information base of the virtual network topology in which the backup path is located, the global label identifying the virtual network topology in which the backup path is located, and sends the packet to a next hop node by using a backup outbound interface and a next hop of the virtual network topology in which the backup path is located.

(2) After receiving the packet (at this time, the packet is an MPLS packet), the next hop node first searches, according to an MPLS global label in the packet, for a label forwarding entry corresponding to the MPLS global label, finds a corresponding backup topology (for example, a second virtual network topology) by indexing according to the label forwarding entry, searches for a routing and forwarding entry in an FIB of the corresponding backup topology (that is, the second virtual network topology), compresses, into the packet and according to the routing and forwarding entry found by searching, the global label identifying the virtual network topology in which the backup path is located, and sends the packet to a next hop according to outbound interface and next hop information.

(3) The next hop node repeats the forwarding processing in (2) until the packet is forwarded to a destination node in the virtual network topology in which the backup path is located.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

According to the controller, the forwarding device, and the packet forwarding method that are provided in the embodiments of the present invention, MPLS global labels or label stacks are allocated to a plurality of IGP topologies by extending an IGP, to implement MPLS network virtualization. The method can be applied to MRT FRR forwarding and achieve the following beneficial effect: when MRT FRR of an IP network is implemented by using global labels or label stacks, only an IGP needs to be extended and LDP does not need to be deployed. By using global labels, MRT FRR can be implemented by using only a few global labels that identify virtual network topologies, which simplifies network virtualization and MRT FRR deployment.

As shown in FIG. 12, in the network system shown in FIG. 3, the controller includes a label allocating module 1200 and a label sending module 1202.

The label allocating module 1200 is configured to allocate a global label to each of the plurality of virtual network topologies. For example, N forwarding devices form X virtual network topologies, and a controller needs to allocate a global label to each virtual network topology, where global labels allocated by the label allocating module 1200 to different virtual network topologies are different.

The label sending module 1202 is configured to send, to the plurality of forwarding devices, a binding relationship between the global labels and the virtual network topologies corresponding to the global labels.

As shown in FIG. 12, in the network system shown in FIG. 3, a forwarding device includes a receiving module 1204, a label forwarding entry generating module 1206, and a forwarding module 1208, where the receiving module 1204 is configured to receive the binding relationship between the global labels and the virtual network topologies that is sent by the controller, and the receiving module 1204 is further configured to receive a packet;

the label forwarding entry generating module 1206 is configured to generate, according to the binding relationship between the global labels and the virtual network topologies that is received by the receiving module 1204, label forwarding entries including a mapping relationship between the global labels and forwarding information bases of the virtual network topologies; and the forwarding module 1208 is configured to find, by searching according to a first global label carried in a first packet received by the receiving module 1204 and in the label forwarding entries generated by the label forwarding entry generating module 1206, a forwarding information base of a first virtual network topology corresponding to the first global label, and forward the first packet by using the forwarding information base of the first virtual network topology.

Optionally, the forwarding device further includes a label adding module 1210. If a packet received by the receiving module 1204 does not carry a global label, and the packet needs to be forwarded from a virtual network topology (for example, a second virtual network topology), the forwarding module 1208 adds a second global label $L_2$ to the packet according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an Internet Protocol (Internet Protocol, IP) forwarding manner in a default network topology, and a forwarding entry of an FIB (Forwarding Information Base) of a default topology in a forwarding device has a backup path in a virtual network topology (for example, a third virtual network topology). When the receiving module 1204 receives an IP packet in the default topology, and the packet cannot be forwarded to a next hop due to a fault of a link or a node, the receiving module 1204 determines, according to the forwarding entry of the default topology, a topology ID (for example, $TID_3$) of a third virtual network topology in which the backup path is located, the label adding module 1210 adds a third global label (for example, $L_3$) corresponding to the topology ID (for example, $TID_3$) to the packet, and the forwarding module 1208 forwards the packet according to the backup path in the third virtual network topology corresponding to the third global label $L_3$.

Optionally, the forwarding information base of the virtual network topology may be the label forwarding information base shown in Table 2 or the label forwarding information base shown in FIG. 8.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Optionally, the forwarding device is a router or a switch.

Optionally, the controller may be a server or a router.

Optionally, the controller may be an IGP server.

Optionally, the module may be an ASIC (Application Specific Integrated Circuit), or a field-programmable gate array (Field-Programmable Gate Array, FPGA), or a Programmable Logic Controller (Programmable Logic Controller, PLC), or may be a network element of a programmable network or a network element of a software-defined network.

For interaction between the controller and the forwarding device shown in FIG. 12 and the context corresponding to FIG. 12, refer to description of FIG. 4 to FIG. 11 and description of the specification corresponding to FIG. 4 to FIG. 11. The controller shown in FIG. 12 and the context corresponding to FIG. 12 may also be the IGP server shown in FIG. 5 and the context corresponding to FIG. 5; and correspondingly, the forwarding device shown in FIG. 12 and the context corresponding to FIG. 12 may also be the IGP client shown in FIG. 5 and the context corresponding to FIG. 5.

Figure 13:
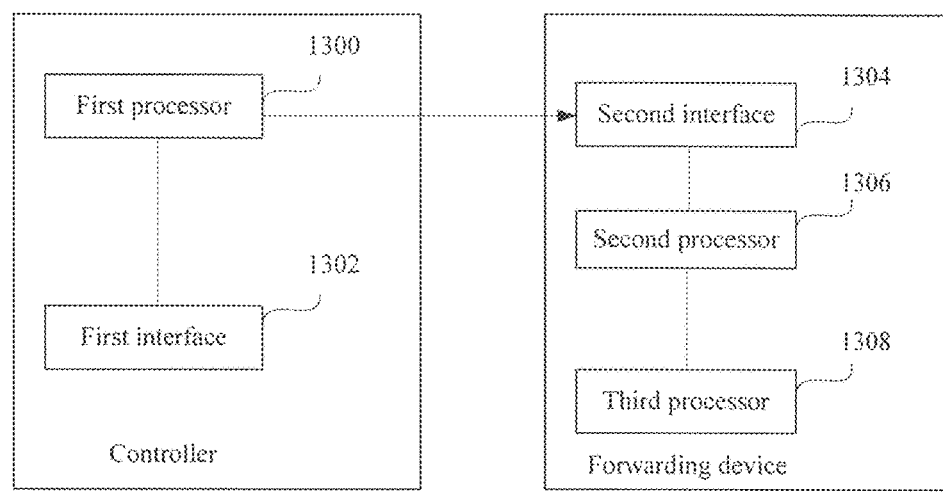
FIG. 13 is a schematic structural diagram of still another network system according to an embodiment of the present invention.

As shown in FIG. 13, in the network system shown in FIG. 3, the controller may include a first processor 1300 and a first interface 1302, where the first processor 1300 is configured to allocate a global label to each of the plurality of virtual network topologies, for example, N forwarding devices form X virtual network topologies, and a controller needs to allocate a global label to each virtual network topology, where global labels allocated by the first processor 1300 to different virtual network topologies are different; and the first interface 1302 is configured to send, to the plurality of forwarding devices, a binding relationship between the global labels and the virtual network topologies corresponding to the global labels.

As shown in FIG. 13, in the network system shown in FIG. 3, the forwarding device includes a second interface 1304, a second processor 1306, and a third processor 1308, where the second interface 1304 is configured to receive the binding relationship between the global labels and the virtual network topologies that is sent by the controller;

the second processor 1306 is configured to generate, according to the binding relationship between the global labels and the virtual network topologies that is received by the second interface 1304, label forwarding entries including a mapping relationship between the global labels and forwarding information bases of the virtual network topologies; and the third processor 1308 is configured to find, by searching according to a first global label carried in a received first packet and in the label forwarding entries generated by the second processor 1306, a forwarding information base of a first virtual network topology corresponding to the first global label, and forward the first packet by using the forwarding information base of the first virtual network topology.

Optionally, the forwarding device further includes a fourth processor 1310. If a packet received by the second interface 1304 does not carry a global label, and the packet needs to be forwarded from a virtual network topology (for example, a second virtual network topology), the third processor 1308 adds a second global label $L_2$ to the packet by using the fourth processor 1310 and according to the second global label $L_2$ corresponding to a topology ID (for example, $TID_2$) of the second virtual network topology, where, on a next hop node, the second global label is indexed to a forwarding information base corresponding to the second virtual network topology.

In an MRT FRR scenario, a packet entering a network is forwarded in an Internet Protocol (Internet Protocol, IP) forwarding manner in a default network topology, and a forwarding entry of an FIB (Forwarding Information Base) of a default topology in a forwarding device has a backup path in a virtual network topology (for example, a third virtual network topology). When the forwarding device receives an IP packet in the default topology, and the packet cannot be forwarded to a next hop due to a fault of a link or a node, the forwarding device determines, according to the forwarding entry of the default topology, a topology ID (for example, $TID_3$) of the third virtual network topology in which the backup path is located, adds a third global label (for example, $L_3$) corresponding to the topology ID (for example, $TID_3$) to the packet, and forwards the packet according to the backup path in the third virtual network topology corresponding to the third global label $L_3$.

Optionally, the forwarding information base of the virtual network topology may be the forwarding information base of the virtual network topology shown in Table 2 or the forwarding information base of the virtual network topology shown in FIG. 8.

Optionally, the global label may be a single global label selected from global label space shared by all forwarding devices.

Optionally, the global label may be formed by a plurality of local labels, that is, each global label includes two or more local labels. A controller allocates two or more local labels to each virtual network topology, two or more local labels allocated to a virtual network topology form a global label, and the formed global label is used to identify the virtual network topology.

Optionally, the forwarding device is a router or a switch.

Optionally, the controller may be a server or a router.

Optionally, the controller may be an IGP server.

Optionally, the first processor, second processor or third processor may be an ASIC (Application Specific Integrated Circuit), or a field-programmable gate array (Field-Programmable Gate Array, FPGA), or a Programmable Logic Controller (Programmable Logic Controller, PLC), or may be a network element of a programmable network or a network element of a software-defined network. The third processor may also be a network processor (Network Processor, NP).

For interaction between the controller and the forwarding device shown in FIG. 13 and the context corresponding to FIG. 13, refer to description of FIG. 4 to FIG. 11 and description of the specification corresponding to FIG. 4 to FIG. 11. The controller shown in FIG. 13 and the context corresponding to FIG. 13 may also be the IGP server shown in FIG. 5 and the context corresponding to FIG. 5; and correspondingly, the forwarding device shown in FIG. 13 and the context corresponding to FIG. 13 may also be the IGP client shown in FIG. 5 and the context corresponding to FIG. 5.

According to the controller, the forwarding device, and the packet forwarding method that are provided in the embodiments of the present invention, MPLS global labels or label stacks are allocated to a plurality of IGP topologies by extending an IGP, to implement MPLS network virtualization. The method can be applied to MRT FRR forwarding and achieve the following beneficial effect: when MRT FRR of an IP network is implemented by using global labels or label stacks, only an IGP needs to be extended and LDP does not need to be deployed. By using global labels or label stacks, MRT FRR can be implemented by using only a few global labels or label stacks that identify virtual network topologies, which simplifies network virtualization and MRT FRR deployment.

In addition, the "binding relationship" in all the embodiments of the present invention is a "mapping relationship" or an associative relationship.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. For example, the detector, sender, receiver, and obtaining unit can all be implemented by using a central processing unit CPU or a dedicated integrated circuit (Application Specific Integrated Circuit, ASIC), or a field-programmable gate array (Field-Programmable Gate Array, FPGA).

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The storage medium includes: any medium that can store program codes, such as a U disk, a removable hard disk, a read-only memory (Read-Only memory, ROM), a random access memory (Random Access Memory, RAM), a magnetic disk, or an optical disk.

Finally, it should be noted that the foregoing embodiments are merely intended to describe the technical solutions of the present invention rather than limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A network system, comprising:
   at least one controller and a plurality of forwarding devices, wherein the plurality of forwarding devices forms a plurality of virtual network topologies;
   wherein the at least one controller is configured to allocate a global label to each of the plurality of virtual network topologies, and send a binding relationship between the global labels and the plurality of virtual network topologies to the plurality of forwarding devices, wherein global labels allocated by the controller to different virtual network topologies of the plurality of virtual network topologies are different; and
   the plurality of forwarding devices is configured to:
      receive the binding relationship between the global labels and the virtual network topologies from the at least one controller,
      generate, according to the binding relationship, label forwarding entries comprising a mapping relationship between the global labels and forwarding information bases of the virtual network topologies, and
      when a first packet received by one forwarding device of the plurality of forwarding devices carries a first global label, the forwarding device finds, by searching according to the first global label, a forwarding information base of a first virtual network topology corresponding to the first global label, and determines that the first packet is to be forwarded by using the forwarding information base of the first virtual network topology, wherein the first virtual network topology is one of the plurality of virtual network topologies.

2. The network system according to claim 1, wherein:
   each of the plurality of forwarding devices is further configured to:
      when a second packet received by the forwarding device does not carry a global label, and the second packet is to be forwarded from a second virtual network topology, add encapsulation of the second global label to the second packet according to a second global label corresponding to the second virtual network topology, wherein, on a next hop node, the second global label is indexed to a forwarding information base corresponding to the second virtual network topology; and
   the second virtual network topology is one of the plurality of virtual network topologies.

3. The network system according to claim 1, wherein the at least one controller comprises:

a label allocating module configured to allocate a global label to each of the plurality of virtual network topologies, wherein labels allocated to different virtual network topologies of the plurality of virtual network topologies are different; and
   a label sending module configured to send, to the plurality of forwarding devices, the binding relationship between the global labels and the virtual network topologies corresponding to the global labels.

4. The network system according to claim 1, wherein each of the forwarding devices comprises:
   a receiving module configured to receive the binding relationship between the global labels and the virtual network topologies corresponding to the global labels that is sent by the at least one controller;
   a label forwarding entry generating module configured to generate, according to the binding relationship between the global labels and the virtual network topologies, label forwarding entries comprising a mapping relationship between the global labels and forwarding information bases of the virtual network topologies; and
   a forwarding module configured to determine, according to the first global label carried in the received first packet, a first label forwarding entry corresponding to the first global label, to determine that the first packet is to be forwarded from the forwarding information base of the first virtual network topology corresponding to the first global label.

5. The network system according to claim 4, wherein:
   the forwarding device further comprises:
      a label adding module configured to, when a second packet received by the receiving module does not carry a global label, and the second packet is to be forwarded from a second virtual network topology, add a second global label to the second packet according to the second global label corresponding to a topology ID of the second virtual network topology, wherein, on a next hop node, the second global label is indexed to a forwarding information base corresponding to the second virtual network topology; and
   the second virtual network topology is one of the plurality of virtual network topologies.

6. The network system according to claim 1, wherein the at least one controller comprises:
   a first processor configured to allocate a global label to each of the plurality of virtual network topologies, wherein global labels allocated to different virtual network topologies of the plurality of virtual network topologies are different; and
   a first interface configured to send, to the plurality of forwarding devices, the binding relationship between the global labels and the virtual network topologies corresponding to the global labels.

7. The network system according to claim 1, wherein each of the forwarding devices comprises:
   a second interface configured to receive the binding relationship between the global labels and the virtual network topologies corresponding to the global labels that is sent by the controller;
   a second processor configured to generate, according to the binding relationship between the global labels and the virtual network topologies, label forwarding entries comprising a mapping relationship between the global labels and forwarding information bases of the virtual network topologies; and a third processor configured to determine, according to the first global label carried in the received first packet, a first label forwarding entry corresponding to the first global label, to determine that the first packet is to be forwarded from the forwarding information base of the first virtual network topology corresponding to the first global label.

8. The network system according to claim 7, wherein:
the forwarding device further comprises a fourth processor configured to, when a second packet received by the second interface does not carry a global label, and the second packet needs to be forwarded from a second virtual network topology, add a second global label to the second packet by using the fourth processor and according to the second global label corresponding to a topology ID of the second virtual network topology, wherein, on a next hop node, the second global label is indexed to a forwarding information base corresponding to the second virtual network topology; and
the second virtual network topology is one of the plurality of virtual network topologies.

9. The network system according to claim 1, wherein the at least one controller is an Interior Gateway Protocol (IGP) server.

10. The network system according to claim 1, wherein the global label comprises two or more labels.

11. A controller, wherein the controller is applied to a network system comprising the controller and a plurality of forwarding devices forming a plurality of virtual network topologies, the controller comprising:
a processor;
memory coupled to the processor, the memory comprising instructions that, when executed by the processor, cause the controller to:
allocate a global label to each of the plurality of virtual network topologies, wherein labels allocated to different virtual network topologies of the plurality of virtual network topologies are different; and
send, to the plurality of forwarding devices, a binding relationship between the global labels and the virtual network topologies corresponding to the global labels.

12. The controller according to claim 11, wherein the global label comprises two or more labels.

13. A forwarding device, wherein the forwarding device is applied to a network system comprising a plurality of forwarding devices and at least one controller, and the plurality of forwarding devices forms a plurality of virtual network topologies, the forwarding device comprising:
a processor;
memory coupled to the processor, the memory comprising instructions that, when executed by the processor, cause the controller to:
receive a binding relationship between the global labels and the virtual network topologies corresponding to the global labels that is sent by the controller;
generate, according to the binding relationship between the global labels and the virtual network topologies, label forwarding entries comprising a mapping relationship between the global labels and forwarding information bases of the virtual network topologies; and
determine, according to a first global label carried in a received first packet, a first label forwarding entry corresponding to the first global label, to determine that the first packet is to be forwarded from a forwarding information base of a first virtual network topology corresponding to the first global label.

14. The forwarding device according to claim 13, wherein the memory further comprises instructions that, when executed by the processor, cause the forwarding device to:
when a second packet received by the receiving module does not carry a global label, and the second packet is to be forwarded from a second virtual network topology, add a second global label to the second packet according to the second global label corresponding to a topology ID of the second virtual network topology, wherein, on a next hop node, the second global label is indexed to a forwarding information base corresponding to the second virtual network topology; and
the second virtual network topology is one of the plurality of virtual network topologies.

15. The forwarding device according to claim 13, wherein the global label comprises two or more labels.

16. A packet forwarding method applied to a network system comprising at least one controller and a plurality of forwarding devices, and the plurality of forwarding devices forms a plurality of virtual network topologies, the method comprising:
receiving a binding relationship between global labels and the virtual network topologies, and generating, according to the binding relationship, label forwarding entries comprising a mapping relationship between the global labels and forwarding information bases of the virtual network topologies, wherein the binding relationship is that the controller allocates a global label to each of the plurality of virtual network topologies, and sends, to the plurality of forwarding devices, the binding relationship between the global labels and the virtual network topologies corresponding to the global labels, wherein global labels allocated by the controller to different virtual network topologies of the virtual network topologies are different; and
when a first packet received by a forwarding device carries a first global label, finding, by the forwarding device by searching according to the first global label, a first label forwarding entry corresponding to the first global label, to determine that the first packet is to be forwarded from the first label forwarding entry of a first virtual network topology corresponding to the first global label, wherein
the first virtual network topology is one of the plurality of virtual network topologies.

17. The method according to claim 16, further comprising:
sending, by the at least one controller, the binding relationship to forwarding devices within an IGP domain by extending an Interior Gateway Protocol (IGP).

18. The method according to claim 16, further comprising:
when a second packet received by a forwarding device does not carry a global label, and the second packet is to be forwarded from a second virtual network topology, adding, by the forwarding device according to a second global label corresponding to a topology ID of the second virtual network topology, the second global label to the second packet, wherein, on a next hop node, the second global label is indexed to a forwarding information base corresponding to the second virtual network topology; and
wherein the second virtual network topology is one of the plurality of virtual network topologies.

19. The method according to claim 16, wherein the global label comprises two or more labels.

\* \* \* \* \*